K. VON KANDO.
ELECTRIC RAILWAY VEHICLE.
APPLICATION FILED DEC. 9, 1914.
1,196,186. Patented Aug. 29, 1916.
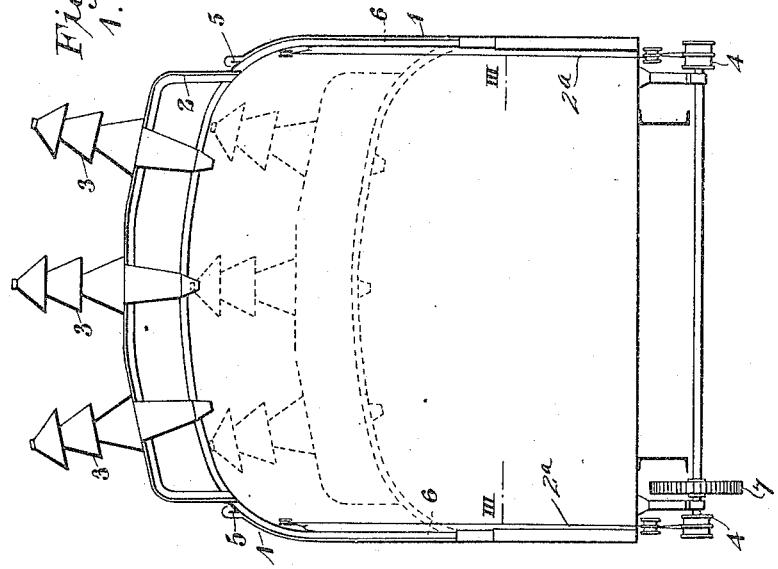
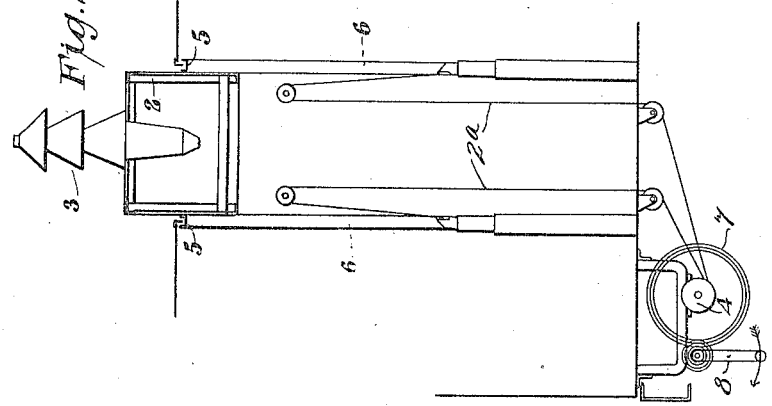
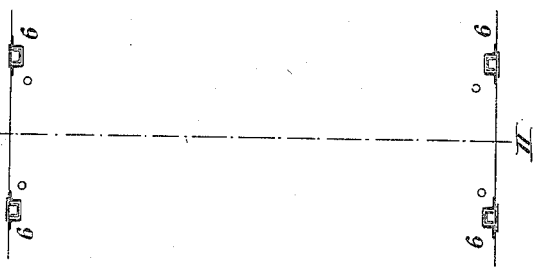
WITNESSES:
INVENTOR:
Kalman Von Kando
BY
HIS ATTORNEY IN FACT.

UNITED STATES PATENT OFFICE.

KALMAN von KANDO, OF VADO LIGURE, ITALY, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

ELECTRIC RAILWAY-VEHICLE.

1,196,186.     Specification of Letters Patent.     Patented Aug. 29, 1916.

Application filed December 9, 1914. Serial No. 876,378.

*To all whom it may concern:*

Be it known that I, KALMAN VON KANDO, a subject of the Emperor of Austria and of the King of Hungary, and a resident of Vado Ligure, in the Kingdom of Italy, have invented a new and useful Improvement in Electric Railway-Vehicles, of which the following is a specification.

This invention relates to electric railway vehicles and in particular to vehicles which are provided with means for leading in high tension conductors through the roof. In these vehicles the insulators for the high tension leads have very large dimensions and project to a considerable height above the vehicle; consequently a very low roof must be furnished in order that the maximum dimensions allowed to the vehicle to enable it to pass through tunnels and under bridges may not be exceeded. In practice there is considerable objection to reducing the height of the roof of the vehicle and the available space inside; consequently provision is often made for dismounting the insulators when necessary, but this gives rise to difficulties owing to the weight and brittle nature of the insulators.

According to the present invention the roof of the vehicle is made of the usual height and an opening is provided for the reception of a rising and falling frame on which the insulators are mounted the said frame when in a raised position forming a part of the roof and effectually closing the opening.

The invention is shown by way of the example in the accompanying drawings in which—

Figure 1 is a transverse section of the body of an electric vehicle having insulators supported on the movable frame in accordance with my invention. Fig. 2 is a portion of a section on line II, II of Fig. 3; and Fig. 3 is a portion of a section on the line III, III, Fig. 1.

Referring now to the drawing, an electric vehicle indicated at 1 is provided with an opening through which the frame 2 forming a portion of the roof is adapted to project. The insulators 3 are mounted on the frame 2 in any suitable or usual manner and means are provided consisting of the ropes 2ª and winding drum 4 by which the frame 2 can be raised or lowered. Said drum can be operated by means of a toothed gear 7 and handle 8 as indicated in Fig. 2. The frame is provided with a channeled edge 5 serving as a gutter which leads rainwater to vertical conduits 6 provided at the side of the vehicle and forming a watertight joint with the edges of the opening in the roof as shown. When the frame is lowered to the position shown for example by the dotted lines in Fig. 1 the opening in the roof may be closed by a sliding door not shown in the drawing.

I claim as my invention:—

1. In an electric railway vehicle, the combination with the roof having an opening therein, of a frame mounted to move in and out of the said opening, and insulators supported on the said frame.

2. In an electric railway vehicle, the combination with the roof having an opening therein, of a frame mounted to move vertically in and out of the said opening and adapted when in its raised position to form a part of the roof and insulators supported on said frame.

3. In an electric railway vehicle, the combination with the roof having an opening therein, of a frame mounted to move vertically in and out of the said opening, the edges of the said frame being adapted to make a substantially water-tight joint with the edges of the opening.

4. In an electric railway vehicle, the combination with the roof having an opening therein, of a frame, and means whereby the said frame can be moved vertically in and out of said opening.

5. In an electric railway vehicle, the combination with the roof having an opening therein, of a frame, means whereby the said frame can be moved vertically in and out of said opening, and insulators supported on said frame.

6. In an electric railway vehicle, the combination with the roof having an opening therein, of a frame mounted to be raised and lowered in said opening, channels at the said frame edges adapted to make a substantially watertight joint with the edges of the opening when the frame is in its raised position, and conduits at the side of the vehicle which communicate with said channels.

7. In an electric railway vehicle, the combination with the roof having an opening therein, of a frame, means for raising and lowering said frame in said opening, and a door for closing said opening when the frame is in its lowered position.

In testimony whereof I have hereunto subscribed my name this 28th day of October, 1914.

KALMAN von KANDO.

Witnesses:
C. A. Ferrari,
H. Boragino.

Copies of this patent may be obtained for five cents each, by addressing the "Commissioner of Patents, Washington, D. C."